United States Patent [19]
Eckel

[11] 3,816,225
[45] June 11, 1974

[54] ACOUSTICAL PANEL ASSEMBLY AND METHOD OF FORMING IT
[76] Inventor: Oliver C. Eckel, 75 Grave St. Apt. 431, Weston, Mass. 62181
[22] Filed: July 26, 1972
[21] Appl. No.: 275,330

[52] U.S. Cl.................. 161/43, 156/196, 161/44, 181/33
[51] Int. Cl............................ B32b 3/02, E04b 2/58
[58] Field of Search ........ 161/41, 43, 44; 181/33 R, 181/33 G; 156/196

[56] References Cited
UNITED STATES PATENTS

| | | | |
|---|---|---|---|
| 2,057,746 | 10/1936 | Schweller | 161/43 X |
| 2,060,241 | 11/1936 | Prudden | 161/43 X |
| 2,253,953 | 8/1941 | Dunbar | 161/43 X |
| 2,880,471 | 4/1959 | Munchhausen | 161/41 UX |
| 3,611,653 | 10/1971 | Zinn | 181/33 X |

FOREIGN PATENTS OR APPLICATIONS

| | | | |
|---|---|---|---|
| 844,641 | 8/1960 | Great Britain | 161/43 |
| 897,995 | 6/1962 | Great Britain | 161/43 |

Primary Examiner—Philip Dier

[57] ABSTRACT

An acoustical panel assembly has two channel members at oppostite sides each having a face portion and two flanges extending from opposite extremities thereof, thereby providing a channel between each set of flanges. A septum extends between the channel members being joined to said face portions intermediate each set of said flanges so that each channel member provides two channels to receive sound insulating material which may be in the shape of thin boards or packs. At the top and bottom are covers which close my panel assembly. A method of forming the assembly first provides the septum with reinforcing means which are joined to the channel member face portions.

10 Claims, 9 Drawing Figures

PATENTED JUN 11 1974　　　　　　　　　　　　　　3,816,225

ACOUSTICAL PANEL ASSEMBLY AND METHOD OF FORMING IT

The principal object of my invention is to provide a new structure in a panel assembly that is simplified, that avoids having loose or uneven side extremity members, and which provides empty spaces between insulation boards at the front and rear of said assembly.

Another object is to provide a panel assembly that is unified and compact, that presents a smooth appearance in assembled position, and is formed of parts that are easy to assemble.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my invention.

Figure 1:
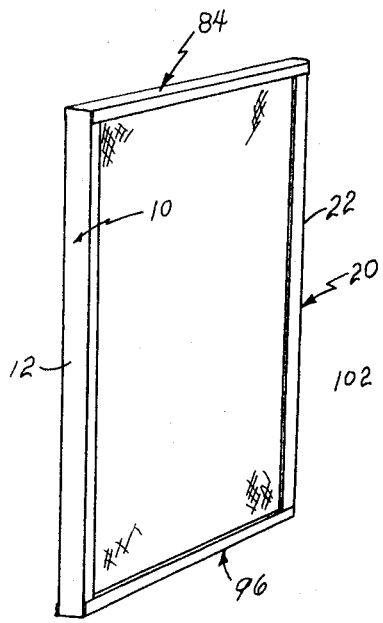
FIG. 1 is a perspective view of my acoustical panel assembly including the covers for it.
Figure 3:
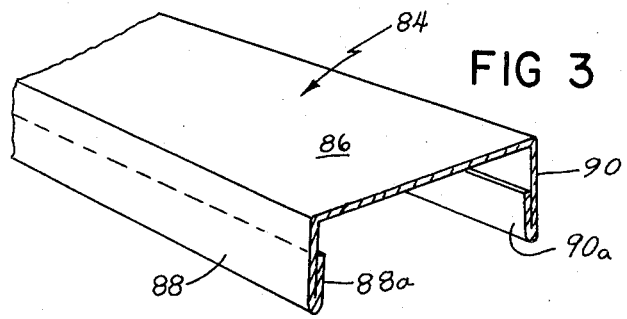
FIG. 3 is a sectional view taken on the line 3—3 of FIG. 4.
Figure 2:
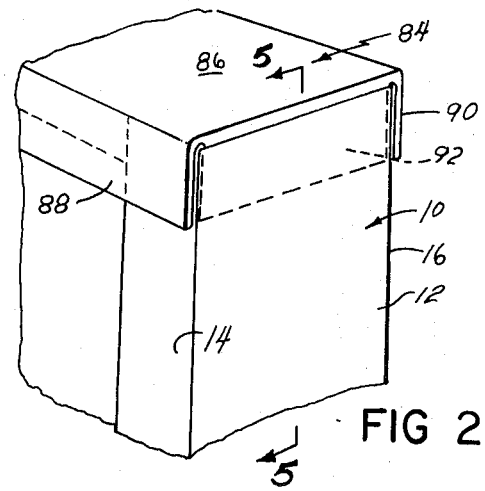
FIG. 2 is an enlarged, fragmentary, perspective view showing an upper corner of my panel with a cover.
Figure 4:
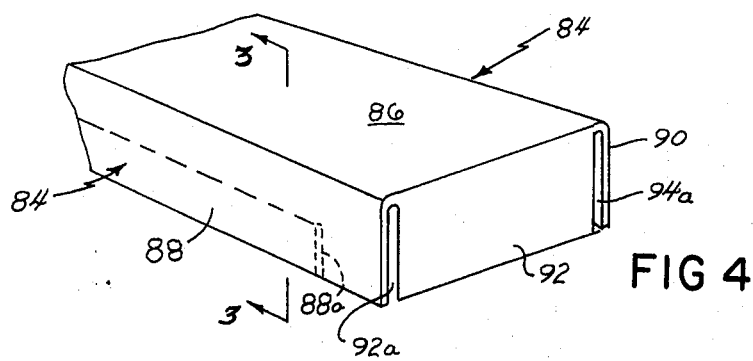
FIG. 4 is a perspective, fragmentary view showing one end of a said cover.
Figure 5:
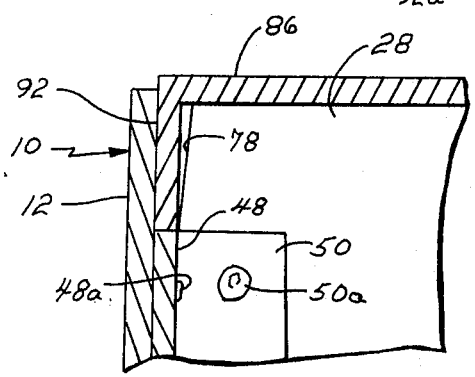
FIG. 5 is a greatly enlarged, sectional view taken on the line 5—5 of FIG. 2.
Figure 5:
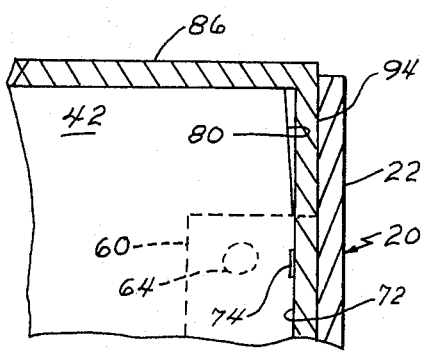
Figure 6:
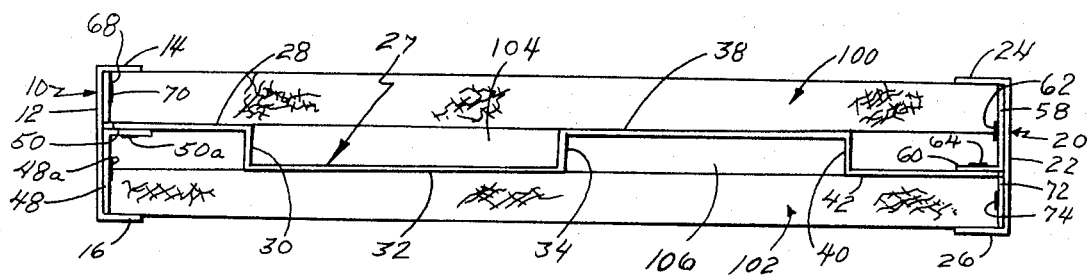
FIG. 6 is a top plan view of my acoustical panel, the cover being removed.
Figure 7:
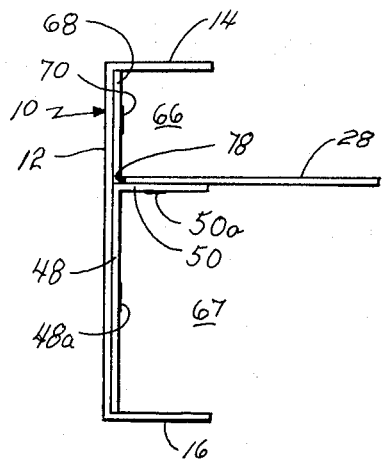
FIG. 7 is a top plan view, greatly enlarged, of one corner of my panel.
Figure 8:
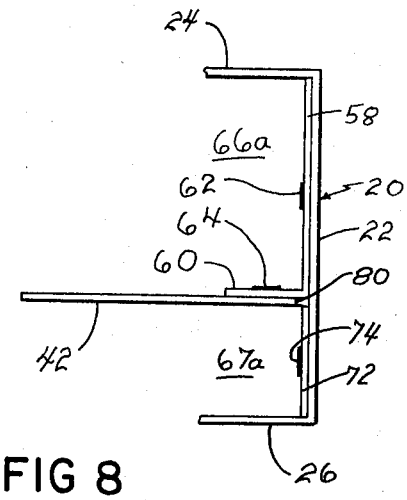
FIG. 8 is a top plan view similar to FIG. 7; but of a corner that is opposite the one shown in FIG. 7.
Figure 9:
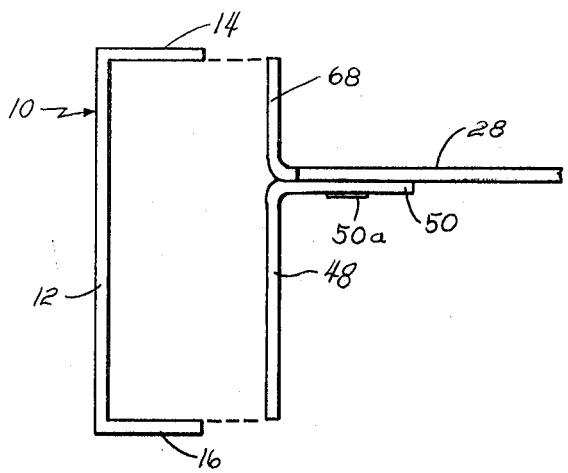

FIG. 9 is a top plan view, greatly enlarged, showing the septum, broken away, with flanges at opposite sides bent from said septum, and with angle reinforcing pieces at opposite sides attached to said septum, prior to attaching said flanges and reinforcing pieces to the channel members, As illustrated, my acoustical panel assembly has for its outer frame means a retainer channel member 10 at one side, called the left side herein, that has a face portion 12 and one set of two flanges 14 and 16 at opposite edges thereof extending inwardly, and spaced apart, and later referred to. At the side opposite said channel member 10, herein called the right side, is a retainer channel member 20 similar to member 10 and having a face portion 22, and another set of two flanges 24 and 26 extending inwardly and spaced apart.

Extending between said channel members 10 and 20 is a septum or panel member 27 having a plurality of stepped portions including a left connector or face portion 28 that reaches to a point adjacent the inner surface of said face portion 10. A flange 30 extends at a right angle forwardly to a face portion 32, and from the latter another flange 34 extends at a right angle rearwardly to another face portion 38. An angular flange 40 extends at a right angle forwardly to another connector or septum face portion 42 that extends to said retainer face portion 22.

Said septum member connector portion 28, at the left, has a reinforcing angle member having a leg 50 spot welded as at 50a to said portion 28. Extending angularly from leg 50 is another leg piece 48 that is spot welded as at 48a to said face portion 12.

Said septum member connector portion 28 has a flange or leg piece 68 that extends to and is spot welded as at 70, to said face portion 12 and is in the same plane as flange or reinforcing member 48.

Said septum member connector portion 42, at the right, has a reinforcing angle member having a leg piece 60 spot welded as at 64 to said connector portion 42. Extending angularly from leg 60 is another leg piece 58 that is spot welded as at 62 to said channel member face portion 22.

Said septum member connecting portion 42 has a flange or reinforcing member 72 that extends to and is spot welded as at 74 to said face portion 22 and is in the same plane as flange or said leg piece 58.

Between said retainer channel members 10 and 20 two channels 66 and 66a are provided that are in horizontal alignment, one being said space 66 between said panel face 28 and flange 14, and the other being the space 66a between said panel face 42 and flange 24. Also between said channel members 10 and 20 two channels 67 and 67a are provided, that are in horizontal alignment, one being the space 67 between said panel face 28 and said flange 16, and the space 67a between said face 42 and said retainer flange 26.

Acoustical insulation enters said channels 66 and 66a, preferably taking the form of a board 100 formed of fiberglass extending between said channel members 10, 20. Likewise similar insulation enters said channels 67 and 67a, shown in the form of said fiberglass board 102, also extending between said channel members 10,20. This leaves an empty space 104 between panel face 32 and said fiberglass board 100, and likewise an empty space 106 between panel face 38 and fiberglass board 102.

Said reinforcing member leg pieces 48 and 58 and said flange or inforcing members 68 and 72 terminate at points spaced from the end extremities of said channel members 10 and 20, thus providing entry spaces 78 and 80 at one end and similar entry spaces, not shown, at the other end for covers 84 and 96 later referred to.

A cover 84 has an outer face portion 86 between two depending sides 88 and 90 spaced apart, portions of which are completely bent over as at 88a and 90a. Said cover 84 has end members 92 and 94 which are spaced from said sides 88 and 90 as at 92a and 94a. Said cover 84 fits over the end extremity of said panel assembly, the sides 88 and 90 being outside of said retainer flanges 14 and 16 and inwardly of said retainer face 22. Said cover ends 92 and 94 extend into the entry spaces 78 and 80 inwardly of and parallel with said face portions 12 and 22.

Since another cover 96 for the opposite end extremity of said panel is used, being of the same construction and fitting into place in the same manner as of cover 84, the details of this cover 96 are not repeated.

In practicing my method said septum connector portion 28 is bent to provide said flange 68, and the leg 50 of a separate reinforcing angle member is joined to said septum connector portion 28. Thereafter said flange 68 and said leg piece 48 are joined to said face portion 12.

Likewise said septum connector portion 42 is bent to provide said flange or reinforcing member 72, and the leg 60 of a separate angle reinforcing member is joined to said connector portion 42. Thereafter said flange or reinforcing member 72 and said leg piece 58 are joined to said face portion 22.

What I claim is:

1. An acoustical panel assembly comprising outer frame means having two retainer channel members at opposite sides of each assembly and spaced apart, each said channel member having a face portion and two sets of flanges extending inwardly from said face portion, a septum having a plurality of stepped portions extending between said retainer channel members and having connectors at opposite side extremities that respectively extend to points adjacent said channel member face portions and intermediate said flanges and spaced from each of the latter, said connectors being in different vertical planes in position of use whereby each set of said channel member flanges and each of said connectors respectively provide two channels at each side of said assembly, said flanges of both said sets being spaced in opposite directions from all portions of said septum, in position of use.

2. An acoustical panel assembly as of claim 1, the space between each of said connectors and one said set of channel member flanges thereat being different than the space between the same said connector and the other said set of flanges.

3. An acoustical panel assembly as of claim 1, a portion of each said connector at opposite extremities being spaced from said channel member face portions adjacent thereto, and two covers each having a face portion and two depending sides therefrom spaced apart, and each cover having two end members each depending from said cover face portion and extending adjacent to and spaced from the end extremities of said sides, said cover sides extending outside of said channel member flanges, and said cover end members extending into the latter said side spaces and inwardly of said channel member face portion.

4. An acoustical panel assembly as of claim 1, said connectors at their side extremities each having an angular reinforcing flange that extends at a right angle and contacts the inner surface of said channel member inner face portion.

5. An acoustical panel assembly as of claim 4, said flanges terminating at a point spaced inwardly from the outer end extremities of each said septum connector.

6. An acoustical assembly as of claim 4, said septum connectors each having a right-angled reinforcing member having an angular leg attached to each of said connectors and extending to and attached to said channel member inner face portion.

7. An acoustical panel assembly as of claim 1, and two covers each having a face portion and two depending sides therefrom spaced apart and two depending end members depending from said cover face portion and extending adjacent to and spaced from the end extremities of said sides respectively, said cover sides extending outside of said channel member flanges, and said cover end members extending into the right-angled reinforcing member spaces and terminating at a point adjacent said right-angled reinforcing member end extremities and extending into said connector reinforcing member spaces and terminating at a point adjacent the end extremities of said angular reinforcing member.

8. An acoustical panel assembly as of claim 3, said cover depending sides each having a bent portion extending to and lying against the inner surface of said cover sides, said bent portions terminating at points spaced from the end extremities of said cover sides.

9. A method of forming an acoustical panel assembly that has a channel member embodying a face portion and two flanges spaced apart extending inwardly from opposite extremities of said face portion, and a septum adapted to extend to a point adjacent said channel member in position of use, comprising bending one extremity of said septum to form a right-angled flange, and attaching said bent portion to said channel member face portion.

10. A method of forming an acoustical panel assembly as of claim 9, said assembly having a separate, right-angled reinforcing member, attaching one leg of said separate reinforcing member to said septum and attaching the other leg thereof to said channel member face portion.

* * * * *